United States Patent [19]

Reddy et al.

[11] Patent Number: 5,471,672
[45] Date of Patent: Nov. 28, 1995

[54] METHOD FOR IMPLEMENTING A HIGH SPEED COMPUTER GRAPHICS BUS

[75] Inventors: Chandrashekar M. Reddy, Santa Clara; Sung-Soo Cho, Sunnyvale, both of Calif.

[73] Assignee: Intel Corporation, Santa Clara, Calif.

[21] Appl. No.: 300,368

[22] Filed: Sep. 2, 1994

Related U.S. Application Data

[63] Continuation of Ser. No. 736,026, Jul. 25, 1991, abandoned.

[51] Int. Cl.⁶ .............................. G06F 13/38; H01J 3/00; H01J 13/00
[52] U.S. Cl. .................... 395/296; 395/280; 395/726; 395/729; 395/162; 364/240.2; 364/260.1; 364/DIG. 1
[58] Field of Search ...................... 395/800, 325, 395/725, 275; 364/240.2, 260.1, DIG. 1

[56] References Cited

U.S. PATENT DOCUMENTS

| | | | |
|---|---|---|---|
| 4,228,496 | 10/1980 | Katzman et al. | 395/200 |
| 4,811,215 | 3/1989 | Smith | 395/425 |
| 4,884,197 | 11/1989 | Sachs et al. | 395/375 |
| 5,079,696 | 1/1992 | Priem et al. | 395/500 |
| 5,111,423 | 5/1992 | Kopec, Jr. et al. | 395/500 |
| 5,121,487 | 6/1992 | Bechtolsheim | 395/325 |
| 5,136,580 | 8/1992 | Videlock et al. | 370/60 |
| 5,193,159 | 3/1993 | Hashimoto et al. | 395/375 |
| 5,218,677 | 6/1993 | Bono et al. | 395/275 |
| 5,243,702 | 9/1993 | Barlow et al. | 395/325 |

FOREIGN PATENT DOCUMENTS 0494056  9/1991  European Pat. Off. .

*Primary Examiner*—Alyssa H. Bowler
*Assistant Examiner*—John Harrity
*Attorney, Agent, or Firm*—Blakely, Sokoloff, Taylor & Zafman

[57] ABSTRACT

A high speed bus for communicating between a processing component and a display component of a computer. The high speed bus substantially enhances video graphics application performance by allowing the process component and the display component to communicate without using the system bus. By coupling the processing component and the display component via a high speed bus, video graphics instructions may be routed directly from the processing component to the display component, thereby eliminating the delay associated with the slower standard system bus lines. By using the high speed bus, the processing component is able to communicate with the display component without having to place instructions onto the busier system bus.

4 Claims, 2 Drawing Sheets

METHOD FOR IMPLEMENTING A HIGH SPEED COMPUTER GRAPHICS BUS

This is a continuation of application Ser. No. 07/736,026 filed Jul. 25, 1991 now abandoned.

FIELD OF THE INVENTION

The present invention pertains to the field of computer systems. Specifically, the present invention pertains to computer systems with a bus architecture.

BACKGROUND OF THE INVENTION

Many computer systems have been designed with a bus architecture. These computer systems typically have a processing component coupled to a bus. Other system components are also typically coupled to the bus. Such other components include display components like VGA and video memory, input/output (I/O) components, system memory and storage devices, and other devices accessible to the processing component via the bus. One such computer system is the IBM Personal Computer (PC) manufactured by the IBM Corporation of Armonk, N.Y.

In order to display information to a user of a computer system, the computer system must generate a video image and display the image on a display device. A typical means for generating a displayable image is to create a bitmap of the image in video memory. A bitmap is an array of one bit memory elements that correspond to the array of picture elements (pixels) on a typical video screen. Methods for manipulating bitmaps to create video images is a technique well known in the art.

In prior art computer systems with a processing component and a display component coupled to a bus, the processing component typically carries most of the burden in creating the bitmaps to be displayed by the display component. In addition to creating bitmaps, the processing component must transfer the bitmaps from the processing component over a relatively slow bus to the video memory and back. Therefore, bus speed becomes a critical factor in determining the performance of a particular application running on the computer system. Other factors that influence the performance in these computer systems include (1) processing component speed, (2) data bus width, and (3) time to transfer data from the display component (VGA) to video memory and back.

Several prior art methods exist for improving the performance of video graphics applications in bus-oriented computer systems. These methods include (1) creating special hardware to offload from the processing component the task of updating video memory and creating and transferring bitmaps, (2) using dual-ported video dynamic random access memory (DRAM) instead of single-ported DRAM to implement the video memory, and (3) using single-ported DRAM to implement video memory, but using video data buffers inside the display component and more complicated arbitration schemes to provide more frequent video memory access to the processing component. Each of these prior art methods are described below.

Regarding the first method of using special video hardware, most of the graphic coprocessors fall into this category. In these systems, the processing component merely writes a command word into the graphics coprocessor which in turn, manipulates the video memory to generate the video image as instructed by the processing component. These systems, however are more expensive to implement, since additional components (i.e. graphic coprocessor and support hardware) are required. Another disadvantage of this method is that extensive software drivers have to be written in order for the existing software to run on machines equipped with such coprocessors. Moreover, use of a coprocessor may render the computer system incompatible with existing components.

The second prior art method of using dual-ported DRAM is also a more expensive option. In these systems, the display component is coupled to one port of the video memory while the processing component is coupled to the second memory port. The number of processing component accesses to video memory is thereby increased. Other than higher cost, this method suffers from the disadvantage of the need for additional logic to reformat the output data.

The third prior art method for improving the performance of video graphics applications is to use video data buffers inside the display component and more complicated arbitration schemes to provide more frequent video memory access to the processing component. In this manner, less expensive single-ported DRAM may be used for video memory. The overall performance of this method is still limited by the bus timing bandwidth for a particular computer system. No significant performance increase may therefore be achieved by this method.

Thus, a better means for communication between a processing component, a display component, and video memory is needed to shorten video memory and I/O access time and thus diminish or eliminate the bus contention.

SUMMARY OF THE INVENTION

The present invention provides a means and method for implementing a high speed graphics bus for a computer system. The high speed graphics bus enhances video graphics applications in bus-oriented computer systems, without the need for additional components or software drivers.

The computer system of the preferred embodiment comprises an expanded processing component, GENCPU, coupled by a data bus to a single chip input/output unit, GENIO, and a single chip graphics interface GENVGA. A system memory is coupled to GENCPU, and a video memory is coupled to GENVGA. GENCPU is also coupled to GENVGA by a high speed bus, (PI-bus).

By coupling GENCPU and GENVGA via a high speed PI-bus, video graphics instructions may by routed directly from GENCPU to GENVGA thus eliminating the delay associated with slower standard system bus lines. By using the PI-bus, GENCPU is able to communicate with GENVGA without having to place instructions onto the more crowded system bus.

GENCPU and GENVGA utilize the high speed PI-bus in the following manner. GENCPU receives an address, decodes the address, and using its registers, determines whether the destination address corresponds to GENVGA space. If the destination address corresponds to GENVGA space and if the PI-bus is enabled, GENCPU initiates a PI-bus cycle. GENCPU indicates the status of the cycle (whether the cycle is an I/O or memory cycle and whether it is a read or write cycle) and places the instruction onto the high speed PI-bus coupling GENCPU and GENVGA. GENCPU also generates a start signal, PSTART#, to indicate the beginning of the PI-bus cycle.

GENVGA monitors signals sent from GENCPU, and upon receiving a PSTART# signal from GENCPU, decodes the incoming instructions and performs the received instructions. To indicate that a PI-bus cycle is in progress, GENCPU sends out a PCMD# command. After GENVGA is finished with its portion of the PI-bus cycle, GENVGA sends a PRDY# signal back to GENCPU. GENCPU then completes the PI-bus cycle by deactivating the PCMD# signal.

DETAILED DESCRIPTION OF THE PREFERRED EMBODIMENT

The present invention provides a means and method for implementing a high speed graphics bus for a computer system. In the following description, numerous specific details are set forth in order to provide a thorough understanding of the invention. However, it will be apparent to one with ordinary skill in the art that these specific details need not be used to practice the present invention. In other instances, well-known structures, circuits, and bus protocols have not been shown in detail in order not to unnecessarily obscure the present invention.

Figure 1:
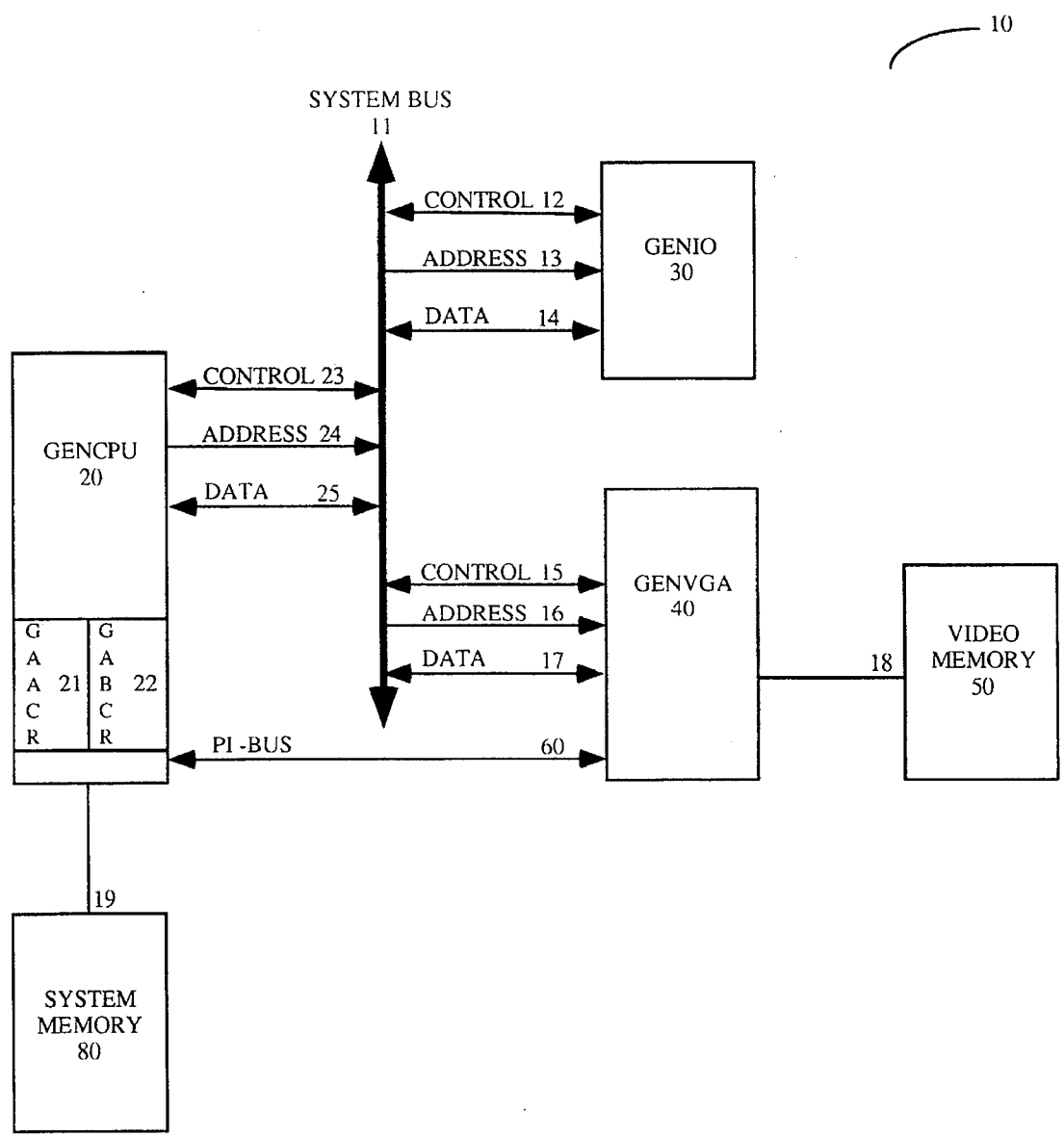
FIG. 1 is a functional block diagram of a microprocessor system embodying the preferred embodiment of the present invention with the PI-bus shown separated from the control, address, and data lines.

Referring to FIG. 1, a preferred embodiment of the computer system 10 of the present invention is shown. In the preferred embodiment, computer system 10 includes a 386$^{TM}$SL Microprocessor manufactured by Intel Corporation, the corporate assignee of the present invention. Such a computer system is compatible with the IBM$^{TM}$ PC AT Personal Computer. System 10 comprises three main subsystem components, designated as GENCPU 20, GENIO 30 and GENVGA 40. The combination of GENCPU 20 and GENIO 30 without the improvement disclosed herein is available from Intel Corporation under a product designation of 386$^{TM}$SL Microprocessor SuperSet.

GENCPU 20 is an expanded processing component including a processor, a memory controller, a cache controller, bus control logic, and line buffers. A system memory 80 is coupled to GENCPU 20. System memory 80 substantially comprises dynamic random access memory (DRAM) devices.

GENIO 30 is a single chip input/output unit comprising parallel ports, dual serial ports, a real time clock unit, dual programmable interrupt controllers, dual programmable timers, dual DMA controllers, and a memory mapper. GENIO 30 also contains programmable registers used by GENCPU 20 to command the GENIO 30 to perform various functions.

GENVGA 40 is a single chip display component comprising a graphics interface and a video memory controller. A video memory 50 is coupled to GENVGA 40. Video memory 50 substantially comprises DRAM devices. GENVGA 40 also contains programmable registers used by GENCPU 20 to command the GENVGA 40 to perform various functions.

GENCPU 20, GENIO 30, and GENVGA 40 communicate with one another and with other system components (such as expansion slots, keyboard controller, disk controllers, etc.) via system bus 11. In the preferred embodiment, system bus 11 is an AT compatible bus. This type of bus is well known in the art.

In the present invention, GENCPU 20 is also coupled to GENVGA by a high speed bus 60. The purpose of this high speed bus 60 (referred to as PI-bus) between GENCPU 20 and GENVGA 40 is to improve the video memory and IO access time and thus eliminate the "bus bottleneck" on bus 11. This allows for the transfer of video data into and out of video memory at high rates. Therefore, a video graphics application program running on an IBM PC computer using the present invention will see improved performance. No special software is necessary to take advantage of the PI-bus protocol. FIG. 1 shows the PI-bus interface between GENCPU 20 and GENVGA 40. The PI-bus protocol will be described below.

In most of the existing systems, a processing component communicates with a display component over a system bus 11 such as the AT Bus. In the new architecture of the present invention, however, GENVGA 40 shares the PC system bus 11 data and address lines and receives PI-Bus 60 control signals in addition to the normal system bus 11 control signals. The individual signals provided on PI-Bus 60 include the following: a start signal (denoted PSTART#), a command signal (denoted PCMD#), a memory or I/O access type signal (denoted PMIO#), a read or write access type signal (denoted PWR#), and a ready signal (denoted PRDY#). These PI-Bus signals are used to control the flow of data from GENCPU 20 to and from GENVGA 40 without the use of system bus control lines. The sequencing of these PI-Bus signals is described in the section below and illustrated in the timing diagram in FIG. 2.

GENCPU 20 includes two registers denoted GAACR 21 and GABCR 22 which are used to enable PI-Bus 60. Register GAACR 21 is used for storing initial address of video memory. Register GABCR 22 is used for storing ending address of video memory. Together, registers 21 and 22 define an address space in video memory. The two registers, GAACR 21 and GABCR 22, also contain a bit to enable the PI-Bus. The bit must be set to enable the PI-Bus in order for PI-Bus cycles to be sent to video memory range. Thus, as instructions are fetched and executed by GENCPU 20, addresses associated with each instruction can be compared with the address space defined by registers GAACR 21 and GABCR 22. If an instruction contains an address located within the video memory range defined by these two registers, and if the PI-Bus bit is enabled, then the PI-Bus is enabled for direct access to video memory, thereby allowing GENCPU 20 to send the addressing signals directly to GENVGA 40. Direct access of video memory by GENCPU 20 can be accomplished using the PI-Bus at speeds in excess of those provided on the system bus 11. Once the PI-Bus 60 is enabled, GENCPU 20 and GENVGA 40 generate PI-Bus signals for all accesses to video memory or I/O registers in GENVGA 40. The sequencing of PI-Bus signals is described below.

GENCPU 20 fetches an input/output or memory access instruction in its normal flow of fetching and executing instructions from system memory 80. Each input/output or memory access instruction contains an operation code portion and an address portion. The operation code (op-code) performs a particular operation on the data at the specified address. Data in video memory may be manipulated in this manner.

After fetching an input/output or memory access instruction, GENCPU 20 decodes the instruction in order to determine the destination address of the instruction. The destination address tells GENCPU the address at which the op-code will be performed. GENCPU then compares the destination address using GENCPU 20 registers GAACR 21 and GABCR 22. If the destination address corresponds to GENVGA space 40 as programmed in registers GAACR 21 and GABCR 22, and if PI-bus 60 is enabled, then GENCPU 20 initiates a PI-bus cycle. If the address is not within the GENVGA space range as defined by the two registers, GAACR 21 and GABCR 22, of GENCPU 20, then the instruction is placed onto the system bus 11.

Figure 2:
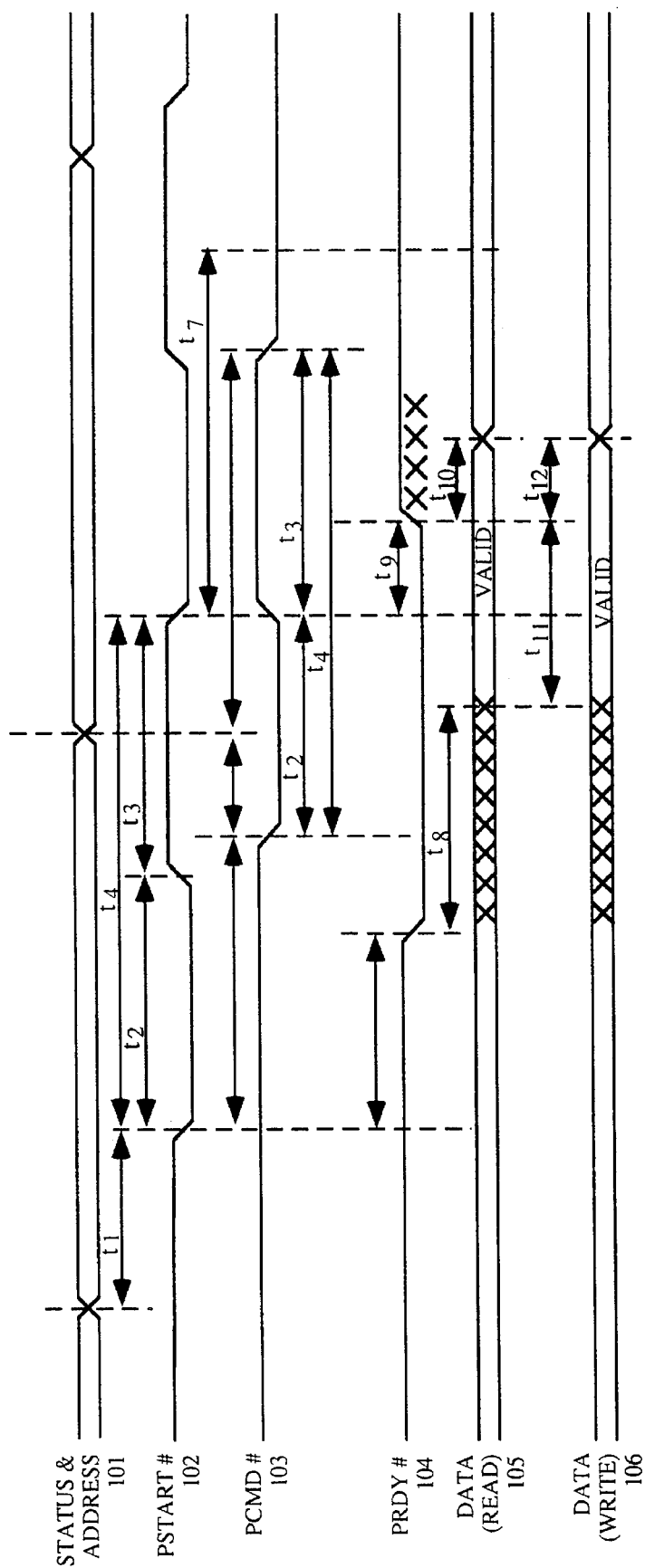
FIG. 2 is a timing diagram of signals associated with the present invention.

In order to initiate a PI-bus cycle, GENCPU 20 generates a start signal, shown in FIG. 2 as PSTART# 102. The PSTART# signal is then placed, by GENCPU, onto the high speed PI-bus 60. Thus, GENCPU 20 is able to send control signals directly to GENVGA 40 without the use of the system bus 11. GENVGA 40 uses the falling edge of the PSTART# signal to latch the address and status signals.

Once GENCPU 20 initiates a PI-bus cycle, GENCPU 20 generates a VGACS instruction corresponding to GENVGA space 40 and puts the address of the instruction onto the PI-bus 60. GENCPU 20 also indicates the status of the cycle of instructions it is placing onto the high speed PI-bus 60. GENCPU 20 indicates whether the cycle of instructions is an I/O or memory cycle (PM/IO#), and whether it is a read or write cycle (PW/R#). The sequencing of these events is shown in FIG. 2 at 101.

GENVGA 40 monitors the high speed PI-bus 60 for signals sent from GENCPU 20. When GENVGA 40 receives a PSTART# signal indicating the initiation of a PI-bus cycle, GENVGA 40 selects the high speed PI-bus 60. In selecting the PI-bus 60, GENVGA 40 receives control signals from the high speed PI-Bus 60, and address signals and data corresponding to GENVGA space 40 from the system bus 11. After receiving instructions from GENCPU 20 via high speed PI-bus 60, GENVGA 40 examines the instruction in order to determine whether the cycle of instructions being sent from GENCPU 20 over high speed PI-bus 60 is an I/O or memory cycle, and whether it is a read or write cycle.

After sending the PSTART# signal to GENVGA 40 over high speed PI-bus 60, GENCPU 20 de-activates the PSTART# signal and places a PCMD# signal onto the high speed PI-bus 60. The PCMD# signal indicates that a PI-bus cycle is in progress. FIG. 2 illustrates the timing of the PCMD# signal at 103. Additionally, if the cycle of instructions, placed by GENCPU 20 onto the high speed PI-bus 60, is to be a write cycle, GENCPU 20 forces data corresponding to the write cycle onto the data bus 17 at this time. GENVGA 40 then receives the data corresponding to the write cycle. FIG. 2 at 105 and 106 illustrates when the read and write data is placed onto the high speed PI-bus 60.

After GENVGA 40 has received all of the instructions sent by GENCPU 20 corresponding to GENVGA space 40, and has completed the cycle by loading the memory or the I/O registers, the PI-bus cycle is completed. GENVGA 40 then places a PRDY# signal onto the high speed PI-bus 60, indicating that GENVGA 40 has finished its portion of the PI-bus cycle. That is, GENVGA 40 has received all of the instructions included in the cycle from GENCPU 20, and is now informing GENCPU 20 that the high speed PI-bus 60 is no longer busy. The timing of the PRDY# signal is shown in FIG. 2 at 104.

After receiving the PRDY# signal from GENVGA 40, GENCPU 20 concludes the PI-bus cycle by de-activating the PCMD# signal. The lack of a PCMD# signal on the high speed PI-bus 60, indicates that no cycle is in progress on the high speed PI-bus 60. Therefore, GENCPU is able to initiate a new PI-bus cycle if needed.

By utilizing a PI-bus 60, several advantages will be noticed. Minimum cycle times for a PI-bus cycle are much faster than minimum cycle times found in existing systems utilizing a standard system bus. Also, the zero wait state time for a PI-bus cycle is shorter than the wait state time for a system bus cycle.

Another advantage of the PI-bus cycle is that video graphics performance is markedly enhanced with no software driver implementation. All compatible software can run on a system featuring the PI-bus without modification. Finally, the PI-bus cycle protocol is not limited solely to video graphics applications. Any fast peripheral controller could make use of the PI-bus type protocol as a means for enhancing system performance.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. In a computer system having a system bus, a processing component coupled to said system bus, and a display component coupled to said system bus, a process for high speed transfer of information between said processing component and said display component, said process comprising the steps of:

(a) receiving an instruction from a system memory, said instruction received by said processing component;

(b) decoding said instruction in order to determine a destination address of said instruction, said instruction decoded by said processing component;

(c) comparing said destination address of said instruction using registers defining a space range of said display component, said destination address compared by said processing component;

(d) placing said instruction onto said system bus if said destination address does not correspond to said display component space range as programmed in said registers, said instruction placed onto said system bus by said processing component;

(e) generating a start signal and placing said start signal onto a high speed bus if said destination address corresponds to said display component space range as programmed in said registers, said high speed bus coupling said processing component and said display component, said start signal generated by said processing component;

(f) placing a command corresponding to said display component onto said high speed bus after said start signal has been placed on said high speed bus, said command placed onto said high speed bus by said processing component;

(g) receiving said start signal from said processing component and selecting said high speed bus, said start signal received by said display component, and said high speed bus selected by said display component;

(h) placing a busy signal onto said high speed bus indicating that a high speed bus cycle is in progress, said busy signal placed onto said high speed bus by said processing component;

(i) receiving said command and instruction from said processing component by said display component;

(j) processing said instruction by said display component;

(k) placing a ready signal onto said high speed bus indicating that said display component is finished with said command and said instruction, said ready signal placed onto said high speed bus by said display component; and (l) after receiving said ready signal sent by said display component, completing said high speed bus cycle by deactivating said busy signal, said busy signal deactivated by said processing component.

2. The process as recited in claim 1 wherein step (f) further comprises the steps of:

placing the instruction corresponding to said display component onto said high speed bus, said address of said instruction placed onto said system bus by said processing component; and indicating whether said instruction corresponding to said display component is an input/output or memory instruction and whether said instruction is a read or write instruction, said indicating step being performed by said processing component.

3. The process as recited claim 1 wherein step (g) further comprises the steps of:

(a) using an edge of said start signal to latch the address, said edge used by said display component;

(b) examining said instruction sent by said processing component on said high speed bus in order to determine whether said instruction is an input/output or a memory instruction, said instruction examined by said display component; and (c) examining said instruction sent by said processing component on said high speed bus in order to determine whether said instruction is a read or write instruction, said instruction examined by said display component.

4. The process as recited claim 1 wherein step (h) further comprises the step of:

placing, by said processing component, data corresponding to a write instruction onto said high speed bus if said instruction is a write instruction.

* * * * *